(12) United States Patent
Tsang et al.

(10) Patent No.: US 6,982,128 B2
(45) Date of Patent: Jan. 3, 2006

(54) CO-CATALYST PROTON EXCHANGE MEMBRANE FUEL CELL UTILIZING BOROHYDRIDE FUELS

(75) Inventors: Joseph W Tsang, Corvallis, OR (US); Ravi Prasad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 10/059,693

(22) Filed: Jan. 28, 2002

(65) Prior Publication Data

US 2003/0143443 A1 Jul. 31, 2003

(51) Int. Cl.
*H01M 4/90* (2006.01)
*H01M 8/18* (2006.01)

(52) U.S. Cl. .............................. 429/19; 429/17; 429/40; 429/105

(58) Field of Classification Search ................... 429/19, 429/17, 40, 105, 27
See application file for complete search history.

(56) References Cited

U.S. PATENT DOCUMENTS

| | | | | |
|---|---|---|---|---|
| 3,666,565 A | * | 5/1972 | Fukuda et al. | 502/101 |
| 3,892,592 A | * | 7/1975 | Fukuda et al. | 252/182.1 |
| 4,341,651 A | | 7/1982 | Beckert et al. | 252/188.25 |
| 4,931,154 A | | 6/1990 | Hale et al. | 204/59 |
| 5,272,017 A | | 12/1993 | Swathirajan et al. | 429/33 |
| 5,316,871 A | | 5/1994 | Swathirajan et al. | 429/33 |
| 5,372,617 A | | 12/1994 | Derrebrock et al. | 48/61 |
| 5,453,169 A | | 9/1995 | Callstrom et al. | 204/242 |
| 5,643,689 A | | 7/1997 | Fleischer et al. | 429/33 |
| 5,741,611 A | | 4/1998 | Fleischer et al. | 429/192 |
| 5,804,329 A | * | 9/1998 | Amendola | 429/34 |
| 5,906,716 A | | 5/1999 | Mertesdort et al. | 204/296 |
| 5,992,008 A | | 11/1999 | Kindler | 29/730 |
| 6,228,338 B1 | | 5/2001 | Petrie et al. | 423/265 |

FOREIGN PATENT DOCUMENTS

| | | |
|---|---|---|
| WO | WO0173880 | 10/2001 |
| WO | WO0174710 | 10/2001 |
| WO | WO02054506 | 7/2002 |
| WO | WO03006366 | 1/2003 |

OTHER PUBLICATIONS http://www.millenniumcell.com/solutions/index.html Millennium Cell—Our Technology Solutions—Technology Overview, no date.
http://www.millenniumcell.com/solutions/white.html Millennium Cell—Our Technology Solutions—White Papers, no date.
http://www.millenniumcell.com/solutions/white hydrogen.html Millennium Cell—Our Technology Solutions White Papers, no date.
Amemdola et al: "An ultrasafe hydrogen generator: aquesous, alkaline borohydride dolutions and Ru Catalyst" Journal of Power Sources 85 (2000) 186–189, (no month).

* cited by examiner

*Primary Examiner*—John S. Maples

(57) ABSTRACT

Two co-catalysts selected from the transitional metals can be employed in proton exchange membrane fuel cells to catalyze a borohydride anolyte, such that diatomic hydrogen produced on the surface of a particle of a first catalyst is diffused to an adjacent surface of a particle of a second catalyst. At the second catalyst the diatomic hydrogen is catalyzed to produce hydrogen ions, which are employed as the mobile ion transported across the electrolyte concurrent with the generation of electrical current. The apparatus operates without the accumulation of hydrogen gas, except as adhered to the surface of the two catalysts.

30 Claims, 1 Drawing Sheet

CO-CATALYST PROTON EXCHANGE MEMBRANE FUEL CELL UTILIZING BOROHYDRIDE FUELS

FIELD OF THE INVENTION

This invention relates in general to the field of fuel cells and in particular to the field of proton exchange membrane ("PEM") fuel cells.

BACKGROUND OF THE INVENTION

Fuel cells convert the electrochemical energy of fuel oxidation reactions into electrical energy. PEM fuel cells are highly efficient devices that operate on hydrogen or on a variety of fuels that can be chemically converted to hydrogen for reaction in the fuel cell. For example, fossil fuels and bio-fuels can be chemically reformed to supply hydrogen. In general, hydrogen gas has been the preferred fuel because of its high reactivity for the electrochemical anode reaction and because the cathode oxidation reaction of the hydrogen ion produces water as a byproduct.

The simplest PEM fuel cells consist of an anode and a cathode sandwiched around an electrolyte. Frequently the electrolyte is a solid-state electrolyte, such as a solid polymer proton exchange electrolyte membrane. Hydrogen fuel is supplied to the anode and oxygen is supplied to the cathode. In the presence of a catalyst such as platinum, the hydrogen atom splits into a proton (hydrogen ion) and an electron at the anode. The proton and electron then proceed along separate paths to the cathode; while the proton reaches the cathode via the electrolyte the electron creates a separate current through an electrical circuit. The proton and electron reunite at the cathode and react with oxygen to produce water. Overall, the electrochemical reactions involved are:

| At the anode: | $2H_2 \rightarrow 4H^+ + 4e^-$ |
| At the cathode: | $O_2 + 4e^- + 4H^+ \rightarrow 2H_2O$ |
| Overall: | $2H_2 + O_2 \rightarrow 2H_2O$ |

In order to maximize the contact area available between the hydrogen fuel, the oxygen, the electrode, and the electrolyte, and in order to minimize the distance that the protons need to travel between the electrodes, the electrodes and electrolyte are usually made to be flat and thin. In addition, the structure of the electrodes is usually porous. However, selection of the composition, the porosity and the dimensions of the electrodes and electrolyte for optimal efficiency of the electrochemical reaction are frequently limited by need for structural integrity required for leak free control of fuel and oxygen at pressures and flow rates that optimize the overall power of the fuel cell.

The voltage produced between the anode and cathode of a fuel cell is typically on the order of about 0.7 V. As a consequence, in order to produce a practical voltage (e.g., between about 10 and 100 V) many fuel cells need to be connected in series referred to as a fuel cell "stack". The preferred method of connecting neighboring fuel cells in a stack involves separating them with bipolar plates. The bipolar plates provide an electrical connection between the anode and cathode of neighboring fuel cells and provide a means of supplying hydrogen to the anode of one fuel cell and a means of supplying oxygen to the cathode of its neighboring cell.

As stated above, gaseous hydrogen is the preferred PEM fuel. However, employing gaseous hydrogen in PEM fuel cell technology poses several practical difficulties. In the accessible environment, hydrogen does not occur naturally in its elemental state, but must be generated either at the fuel cell location or remotely. When generated remotely, hydrogen fuel must be transported, stored and delivered to the fuel cell. At atmospheric pressure, the low energy density of gaseous hydrogen limits the theoretical power density of the fuel cell. To raise the energy density, higher pressures are used. One negative effect is that the heavy, bulky and expensive storage and delivery systems required to employ high pressure hydrogen gas systems produce low power to total weight ratios and limit application of the technology in many situations. Additionally, gaseous hydrogen's flammability poses significant safety concerns. Safety, weight and power restrictions make alternatives to stored hydrogen gas desirable.

One alternative is to employ available hydrocarbon compounds as primary fuels that can be chemically converted to produce gaseous hydrogen as a secondary fuel for fuel cell consumption. Different chemical conversion technologies are available to convert such fuels into gaseous hydrogen. For example, various fossil fuels may be catalytically reformed into hydrogen rich mixture. However, hydrocarbon fuels pose several difficulties. Reforming most hydrocarbons requires complex mechanical systems, additional catalysts and high temperatures. Undesirable environmental pollutants are common byproducts. Additionally, common byproducts of reforming can significantly reduce the efficiency of fuel cell catalysts. An interesting exception is methanol, which does not require reforming for use in PEM fuel cells. Methanol, mixed with water, can be catalyzed to produce hydrogen ions at the anode of the fuel cell. Unfortunately, such direct methanol fuel cells have slow rates of reaction and, thus, low operating voltages, low power density and low efficiency.

An emerging alternative approach in fuel cell technology is to employ, as primary fuels, hydrogen dense specialized chemical compounds as alternatives to stored gaseous (or liquid) hydrogen and to reformed hydrocarbon fuels. Critical features of these compounds are: (1) for their mass, the compounds hold large quantities of hydrogen; (3) the compounds easily release their hydrogen; (2) manufacture of the compounds is simple and requires little energy; (4) the compounds are stable and safe to handle. Additional desirable features for these compounds are that the compounds and their byproducts are non-toxic and recyclable.

While a large number of specialized chemicals have been investigated, the hydrides have been shown to the most important of these potential hydrogen storage compounds. Simple metal hydrides, such as alkali metal hydrides and rare earth metal hydrides, have been investigated. When reacted with water, alkali metal hydrides give off hydrogen gas. The rare earth metal hydrides, under the right conditions, simply release hydrogen gas without requiring another reactant. Complex hydrides, such as borohydrides and aluminum hydrides, have also been investigated. Unfortunately, many of these hydrides have one or more drawbacks, such as being toxic, caustic or have hydrogen release rates that are difficult to control at operating temperatures.

Although specialized chemicals have reduced the need to provide hydrogen gas storage and delivery systems, the current art does not completely eliminate the use of gaseous hydrogen in practical PEM fuel cells. Except for direct methanol feed fuel cells, all practical PEM fuel cells use hydrogen in a gaseous state within the anolyte fuel channels. Most of the limitations of employing gaseous hydrogen remain, including: a low energy density at atmospheric pressures; design compromises necessary to accommodate higher than atmospheric pressure hydrogen gas systems; lowering of power to total weight ratios; and hydrogen's flammability.

Accordingly, it would be desirable to provide a safe, non-toxic, recyclable fuel that has a high density of hydrogen and is readily useable in a PEM fuel cell without producing an accumulation of gaseous hydrogen in the anolyte fuel channels or other fuel supply systems.

SUMMARY OF THE INVENTION

We have discovered that two co-catalysts selected from the transitional metals can be employed in PEM fuel cells to catalyze a borohydride anolyte, such that diatomic hydrogen produced on the surface of a particle of a first catalyst is diffused to an adjacent surface of a particle of a second catalyst. At the second catalyst the diatomic hydrogen is catalyzed to produce hydrogen ions, which are employed as the mobile ion transported across the electrolyte concurrent with the generation of electrical current. The apparatus operates without the accumulation of hydrogen gas, except as adhered to the surface of the two catalysts.

BRIEF DESCRIPTION OF THE DRAWING

A preferred embodiment of the invention is described with reference to a figure of the drawing, in which.

DETAILED DESCRIPTION OF A PREFERRED EMBODIMENT

Figure 1:
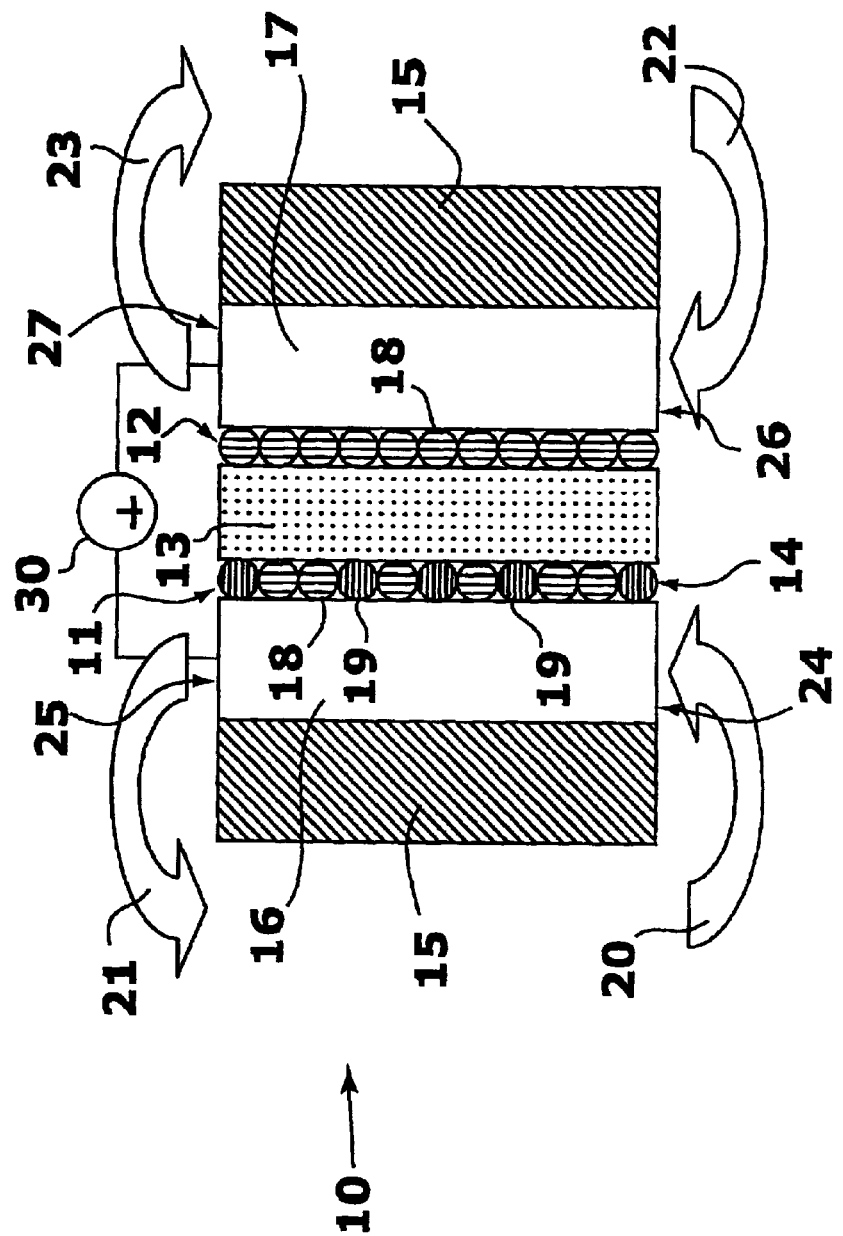
FIG. 1 is a cross-sectional view of a single fuel cell with embedded co-catalysts.

Recently, it has been shown that hydrogen can be generated readily from various solutions of borohydride ions in the presence of a transition metal catalyst. For instance, aqueous sodium borohydride in the presence of ruthenium is readily catalyzed to produce elemental hydrogen and metaborate byproducts. Overall, the electrochemical reaction involved is:

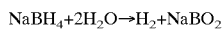

Such solutions hold large quantities of hydrogen and easily release their hydrogen in the presence of an appropriate catalyst. They are stable, non-toxic and their manufacture is simple and requires little energy.

One aspect of the invention features a co-catalysts assembly embedded in the membrane of the anode side of the MEA. The two catalysts are typically selected from the group consisting of ruthenium, rhodium, cobalt, iron, nickel, palladium, rhenium, osmium, and platinum. The selection of the two catalysts and the method for structuring the co-catalysts assembly will be optimized for the anolyte-to-hydrogen conversion process and for electrical energy production. Typically, the selection of platinum as the second catalyst will be optimal for electrical energy production via the $2H_2+O_2 \rightarrow 2H_2O$ electrochemical reaction. The selection of the first catalyst will be determined by the composition of the particular borohydride metal salt employed as the anolyte for the fuel cell. In a preferred embodiment, ruthenium is an optimal first catalyst for a sodium borohydride anolyte for diatomic hydrogen production via the $NaBH_4+ 2H_2O \rightarrow H_2+NaBO_2$ electrochemical reaction.

According to another aspect of the invention, the borohydride anolyte is a solution of a borohydride metal salt and a carrier. The carrier may be aqueous or non-aqueous so long as it dissolves both the borohydride and the reduced boron compound which is a byproduct of the electrochemical reaction at the first catalyst. Typically, the carrier is an aqueous solution. In a preferred embodiment the reduced boron compound is oxidizable to a borohydride to enable the spent anolyte to be recycled. Also in a preferred embodiment, sodium borohydride in a water carrier is the anolyte. Sodium borohydride is soluble in water up to 44% by weight. Therefore a saturated solution of this metal salt will have a high stored energy density from the available hydrogen. In anhydrous ammonia the solubility and stored energy density is even higher.

Borohydride concentrations within the anolyte and flow rates of the anolyte over the co-catalysts assembly must be controlled so that the rate of production of diatomic hydrogen at the first catalyst does not exceed the rate of conversion, i.e. the overall rates for diffusion of diatomic hydrogen to the second catalyst, the production of the hydrogen ion and the transport of the hydrogen ion across the MEA. If the rate of diatomic hydrogen production exceeds the rate of conversion the excess will accumulate as hydrogen gas. The rate of diatomic hydrogen production may be reduced either by slowing or stopping the anolyte flow or by diluting the concentration of the borohydride in the anolyte.

A preferred embodiment of the invention is illustrated in FIG. 1. FIG. 1 illustrates a proton exchange membrane fuel cell 10 having an anode 11, a cathode 12 and a solid polymer proton-conducting cation-exchange electrolyte membrane 13. The anode 11, cathode 12 and solid polymer electrolyte membrane 13 are bonded to form a single multi-layer composite structure referred to herein as a membrane electrode assembly (MEA). Bipolar plates 15 are attached to the MEA so as to provide an electrical connection, structural support and, with the electrodes, to form the anode and cathode flow channels 16, 17.

In this preferred embodiment, anode 11 is structured for liquid feed. The anode structures are porous and are wetted by the liquid anolyte. In addition, the structures have both electronic and ionic conductivity to effectively transport electrons to the anode current collector and hydrogen/hydrogen ions to the electrolyte membrane. Furthermore, the anode structure must help achieve favorable hydrogen diffusion characteristics in the co-catalyst assembly 14 embedded in the anode membrane.

Co-catalyst assembly 14 is formed from a fine bimetallic powder of separate platinum particles 18 and separate ruthenium particles 19. The platinum and ruthenium particles are embedded either as unsupported metal powder, or, preferably, dispersed on high surface area carbon support, which is itself attached or embedded in the membrane of anode 11. In a preferred embodiment, the platinum and ruthenium compounds are uniformly mixed and randomly spaced throughout the material. This homogeneous bimetallic powder is used as the anode co-catalyst materials comprising ruthenium first catalyst sites 19 and platinum second catalyst sites 18. The preferred ratio of platinum to ruthenium is 50%/50% (mole percentage), but the ratio can vary between 99%/1% and 1%/99%. For platinum-ruthenium, the preferred loading of the support matrix of the MEA may range from 0.1 to 20% by weight. More efficient electrochemical reactions are realized at higher loading levels.

Cathode 12 is a gas diffusion electrode in which platinum particles 18 are bonded to the cathode. Cathode 12 is preferably formed from platinum particles 18 either as fine unsupported metal powders, or, preferably, dispersed on high surface area carbon support, which itself is attached or embedded in the membrane of cathode 12. For platinum particles 18 in the cathode 12, the loading of the support matrix of the MEA ranges from 0.1 to 20% by weight. More efficient electro-chemical reactions are realized at higher loading levels.

Upon demand for electrical current, sodium borohydride anolyte solution 20 is flowed through an inlet port 24 into the anolyte flow channel 16. The reacted anolyte 21 is then withdrawn through an outlet port 25. The catholyte flow channel 17 is filled with air or oxygen as a catholyte gas, either at ambient pressure or in a pressurized state. During operation, the sodium borohydride in anolyte flow channel 16 is flowed past anode 11. Oxygen or air 22 is flowed through a inlet port 26 into the catholyte flow channel 17 and circulated past cathode 12. Byproduct water vapor 23 is exhausted though an outlet port 27 of the catholyte flow channel 17.

When sodium borohydride anolyte solution 20 is flowed over ruthenium first catalyst site 19 in anode 11, borohydride ion is catalyzed to produce diatomic hydrogen. The diatomic hydrogen diffuses (primarily through surface diffusion) to an adjacent platinum second catalyst site 18 in anode 11. Electro-oxidation of hydrogen occurs at platinum second catalyst site 18 in anode 11 and electro-reduction of oxygen occurs at cathode 12. The occurrence of different reactions at anode 11 and cathode 12 give rise to a voltage difference between those two electrodes. Electrons generated by electro-oxidation at platinum second catalyst site 18 in anode 11 are conducted through external load 30 and are captured at cathode 12. Hydrogen ions or protons generated at platinum second catalyst site 18 in anode 11 are transported directly across membrane electrolyte 13 to cathode 12. A flow of current is sustained by a flow of ions through the cell and electrons through external load 30.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A proton exchange membrane fuel cell comprising:
   a membrane electrode assembly comprising a proton permeable membrane bonded on one side to a porous anode and bonded on the opposite side to a porous cathode;
   a continuous supply of a borohydride anolyte and a means of flowing the anolyte over the anode of the cell;
   a continuous supply of a catholyte and a means of flowing the catholyte over the cathode of the cell;
   a first anode catalyst embedded in surface of the anode and catalyzing the anolyte to generate hydrogen;
   a second anode catalyst separately embedded in surface of the anode and catalyzing hydrogen produced by the first anode catalyst to generate hydrogen ions; and
   a cathode catalyst embedded in surface of the cathode and catalyzing the catholyte.

2. The fuel cell of claim 1, wherein hydrogen diffuses from the first anode catalyst to the second anode catalyst without the accumulation of hydrogen gas beyond the surfaces of the two anode catalysts.

3. The fuel cell of claim 1, wherein the first anode catalyst is selected from the group consisting of ruthenium, rhodium, cobalt, iron, nickel, palladium, rhenium, osmium, and platinum.

4. The fuel cell of claim 3, wherein the first anode catalyst is ruthenium.

5. The fuel cell of claim 1, wherein the second anode catalyst is selected from the group consisting of ruthenium, rhodium, cobalt, iron, nickel, palladium, rhenium, osmium, and platinum.

6. The fuel cell of claim 5, wherein the second anode catalyst is platinum.

7. The fuel cell of claim 1, wherein the cathode catalyst is selected from the group consisting of ruthenium, rhodium, cobalt, iron, nickel, palladium, rhenium, osmium, and platinum.

8. The fuel cell of claim 7, wherein the cathode catalyst is platinum.

9. The fuel cell of claim 1, wherein the borohydride anolyte comprises a carrier mixed with a borohydride compound.

10. The fuel cell of claim 9, wherein the borohydride anolyte carrier is an aqueous carrier.

11. The fuel cell of claim 9, wherein the borohydride anolyte carrier is a non-aqueous carrier.

12. The fuel cell of claim 9, wherein the borohydride compound is a metal borohydride salt.

13. The fuel cell of claim 12, wherein the borohydride compound is sodium borohydride.

14. The fuel cell of claim 1, wherein the catholyte is oxygen gas.

15. The fuel cell of claim 1, wherein the catholyte is air.

16. A method of obtaining electrical power through the electrochemical conversion of a continuous supply of a borohydride anolyte within a proton exchange membrane fuel cell basing a membrane electrode assembly comprising a proton permeable membrane bonded on one side to a porous anode and bonded on the opposite side to a porous cathode, the method comprising the step of:
    selecting and embedding in surface of the anode a first anode catalyst to generate hydrogen by catalyzing to anolyte; and
    selecting and separately embedding in surface of the anode a second anode catalyst to generate hydrogen ions by catalyzing hydrogen produced by the first catalyst;
    selecting and embedding in surface of the cathode a cathode catalyst to catalyze the catholyte;
    flowing the catholyte over the cathode of the cell; and
    flowing the anolyte over the anode of the cell.

17. The method of claim 16, wherein hydrogen diffuses from the first anode catalyst to the second anode catalyst without the accumulation of hydrogen gas beyond the surfaces of the two anode catalysts.

18. The method of claim 16, wherein the first anode catalyst is selected from the group consisting of ruthenium, rhodium, cobalt, iron, nickel, palladium, rhenium, osmium, and platinum.

19. The method of claim 18, wherein the first anode catalyst selected is ruthenium.

20. The method of claim 16, wherein the second anode catalyst is selected from the group consisting of ruthenium, rhodium, cobalt, iron, nickel, palladium, rhenium, osmium, and platinum.

21. The method of claim 20, wherein the second anode catalyst selected is platinum.

22. The method of claim 16, wherein the cathode catalyst is selected from the group consisting of ruthenium, rhodium, cobalt, rhenium, osmium, and platinum.

23. The method of claim 22, wherein the cathode catalyst selected is platinum.

24. The method of claim 16, wherein the borohydride anolyte comprises a carrier mixed with a borohydride compound.

25. The method of claim 24, wherein the borohydride anolyte carrier is an aqueous carrier.

26. The method of claim 24, wherein the borohydride anolyte carrier is a non-aqueous carrier.

27. The method of claim 24, wherein the borohydride compound is a metal borohydride salt.

28. The method of claim 27, wherein the borohydride compound is sodium borohydride.

29. The method of claim 16, wherein the catholyte is oxygen gas.

30. The method of claim 16, wherein the catholyte is air.

* * * * *